US012080912B2

(12) United States Patent
Hwang et al.

(10) Patent No.: US 12,080,912 B2
(45) Date of Patent: Sep. 3, 2024

(54) BATTERY CASE FOR SECONDARY BATTERY AND METHOD FOR MANUFACTURING POUCH TYPE SECONDARY BATTERY

(71) Applicant: LG Energy Solution, Ltd., Seoul (KR)

(72) Inventors: Soo Ji Hwang, Daejeon (KR); Sang Hun Kim, Daejeon (KR); Yong Su Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 102 days.

(21) Appl. No.: 17/626,895

(22) PCT Filed: Aug. 25, 2020

(86) PCT No.: PCT/KR2020/011312
§ 371 (c)(1),
(2) Date: Jan. 13, 2022

(87) PCT Pub. No.: WO2021/040377
PCT Pub. Date: Mar. 4, 2021

(65) Prior Publication Data
US 2022/0255186 A1 Aug. 11, 2022

(30) Foreign Application Priority Data
Aug. 27, 2019 (KR) .................. 10-2019-0105418

(51) Int. Cl.
*H01M 50/30* (2021.01)
*H01M 50/105* (2021.01)
(Continued)

(52) U.S. Cl.
CPC ....... *H01M 50/394* (2021.01); *H01M 50/105* (2021.01); *H01M 50/1243* (2021.01); *H01M 50/186* (2021.01)

(58) Field of Classification Search
CPC ............. H01M 50/394; H01M 50/186; H01M 50/105; H01M 50/1243
See application file for complete search history.

(56) References Cited

U.S. PATENT DOCUMENTS

| 2003/0232236 A1 | 12/2003 | Mitchell et al. |
| 2009/0029641 A1 | 1/2009 | Furuuchi |

(Continued)

FOREIGN PATENT DOCUMENTS

| CN | 102559143 A | * | 7/2012 |
| CN | 103201890 A | | 7/2013 |

(Continued)

OTHER PUBLICATIONS

Machine translation of CN102559143A (Year: 2023).*

(Continued)

*Primary Examiner* — Milton I Cano
*Assistant Examiner* — Albert Michael Hilton
(74) *Attorney, Agent, or Firm* — Lerner David LLP

(57) ABSTRACT

A battery case for a secondary battery according to an embodiment of the present invention can include a cup part having an accommodation space configured to accommodate an electrode assembly in which electrodes and separators are stacked; a sealing part extending to the outside of the cup part; a gas discharge part attached to a hole which is formed to be punched in at least one of the cup part or the sealing part from the outside and through which a gas passes; and a coating part applied to an inner circumferential surface of the hole and having electrolyte resistance, wherein the gas discharge part includes: a gas discharge layer through which the gas passes; and an outer functional layer formed on an outer surface of the gas discharge layer and having a hydrophobic property.

13 Claims, 6 Drawing Sheets

(51) Int. Cl.
    *H01M 50/124* (2021.01)
    *H01M 50/186* (2021.01)

(56) References Cited

U.S. PATENT DOCUMENTS

| | | | |
|---|---|---|---|
| 2012/0021261 A1 | 1/2012 | Kim | |
| 2013/0048125 A1* | 2/2013 | Hoffman | B65D 77/225 |
| | | | 383/103 |
| 2013/0244093 A1 | 9/2013 | Min et al. | |
| 2014/0120387 A1 | 5/2014 | Kinuta et al. | |
| 2016/0336552 A1* | 11/2016 | MacLean | H01M 50/178 |
| 2017/0069891 A1 | 3/2017 | Ishii et al. | |
| 2017/0274416 A1 | 9/2017 | Yeom | |
| 2018/0233722 A1* | 8/2018 | Holman | H01M 50/557 |

FOREIGN PATENT DOCUMENTS

| | | |
|---|---|---|
| CN | 107107096 A | 8/2017 |
| JP | 3191644 B2 | 7/2001 |
| JP | 2005123267 A | 5/2005 |
| JP | 2006324086 A | 11/2006 |
| JP | 2008-198664 A | 8/2008 |
| JP | 2010033940 A | 2/2010 |
| JP | 4622019 B2 | 2/2011 |
| JP | 2011108433 A | 6/2011 |
| JP | 2015170473 A | 9/2015 |
| JP | 2015195191 A | 11/2015 |
| JP | 2016157538 A | 9/2016 |
| JP | 2017139125 A | 8/2017 |
| JP | 2017-206777 A | 11/2017 |
| JP | 2017220656 A | 12/2017 |
| JP | 2018006182 A | 1/2018 |
| KR | 20100109341 A | 10/2010 |
| KR | 101472202 B1 | 12/2014 |
| KR | 20150034498 A | 4/2015 |
| KR | 101577883 B1 | 12/2015 |
| KR | 20150135878 A | 12/2015 |
| KR | 20170011358 A | 2/2017 |
| KR | 20170057297 A | 5/2017 |
| KR | 101902483 B1 | 10/2018 |
| KR | 20190042215 A | 4/2019 |
| WO | 2018110067 A1 | 6/2018 |

OTHER PUBLICATIONS

International Search Report for Application No. PCT/KR2020/011312 mailed Dec. 2, 2020, 2 pages.
Extended European Search Report for Application No. 20857351.9 dated Dec. 5, 2022. 9 pgs.
Search Report dated Jul. 24, 2023 from the Office Action for Chinese Application No. 202080050817.3 issued Jul. 26, 2023, pp. 1-2. [See p. 1, categorizing the cited references].
Search Report dated Jan. 12, 24 from the Office Action for Chinese Application No. 202080050817.3 issued Jan. 17, 2024. 2 pgs.

* cited by examiner

BATTERY CASE FOR SECONDARY BATTERY AND METHOD FOR MANUFACTURING POUCH TYPE SECONDARY BATTERY

CROSS-REFERENCE TO RELATED APPLICATION

The present application is a national phase entry under 35 U.S.C. § 371 of International Application No. PCT/KR2020/011312 filed on Aug. 25, 2020, which claims the benefit of the priority of Korean Patent Application No. 10-2019-0105418, filed on Aug. 27, 2019, the disclosures of which are incorporated herein by reference in their entirety.

TECHNICAL FIELD

The present invention relates to a battery case for a secondary battery and a method for manufacturing a pouch type secondary battery, and more particularly, to a battery case for a secondary battery, which is capable of discharging an inner gas to the outside to adjust a pressure when an internal pressure of a pouch increases, a method for manufacturing a pouch type secondary battery.

BACKGROUND ART

In general, secondary batteries include nickel-cadmium batteries, nickel-hydrogen batteries, lithium-ion batteries, and lithium-ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In the secondary battery, a gas may be generated by internal short-circuit, overcharging, overdischarging, or the like due to an external impact. In addition, when the secondary battery is stored at a high temperature, an electrochemical reaction between an electrolyte and an electrode active material is quickly promoted by the high temperature to generate a gas.

Here, the generated gas may allow the secondary battery to increase in internal pressure to cause problems such as weakening of bonding force between components, damage of a case of the secondary battery, an early operation of a protection circuit, deformation of an electrode, internal short-circuit, explosion, and the like. To prevent these phenomena, in the case of the can type secondary battery, a protection member such as a CID filter and a safety vent is provided. Thus, when the pressure within the case increases, electrical connection may be physically interrupted. However, in the case of the pouch type secondary battery according to the related art, the protection member is not sufficiently provided.

DISCLOSURE OF THE INVENTION

Technical Problem

An object of the present invention for solving the above problems is to provide a battery case for a secondary battery, which is capable of discharging an inner gas to the outside to adjust a pressure when an internal pressure of a pouch increases, a method for manufacturing a pouch type secondary battery.

The objects of the present invention are not limited to the aforementioned object, but other objects not described herein will be clearly understood by those skilled in the art from descriptions below.

Technical Solution

A battery case for a secondary battery according to an embodiment of the present invention for solving the above problems includes: a cup part having an accommodation space configured to accommodate an electrode assembly in which electrodes and separators are stacked; a sealing part extending to the outside of the cup part; a gas discharge part attached to a hole which is formed to be punched in at least one of the cup part or the sealing part from the outside and through which a gas passes; and a coating part applied to an inner circumferential surface of the hole and having electrolyte resistance, wherein the gas discharge part includes: a gas discharge layer through which the gas passes; and an outer functional layer formed on an outer surface of the gas discharge layer and having a hydrophobic property.

Also, the coating part may include at least one of at least one of polypropylene (PP), polyethylene (PE), or epoxy.

Also, the outer functional layer may be formed by distributing a plurality of fine protrusions on an outer surface thereof.

Also, each of the fine protrusions may have a diameter of 50 nm to 10 μm.

Also, each of the fine protrusions may have a diameter of 100 nm to 1 μm.

Also, the inner functional layer may include an oil or wax component.

Also, the oil may include at least one of fluorinated carbon oil, silicone oil, carbon-based oil, or fatty acid amide.

Also, the gas discharge layer may include at least one of polypropylene (PP), polyethylene (PE), polytetrafluoroethylene (PTFE), or polyvinylidene fluoride (PVDF).

Also, the gas discharge part may further include an inner functional layer formed on an inner surface of the gas discharge layer and having a hydrophobic property.

Also, the sealing part may include: an inner area adjacent to the cup part; and an outer area disposed outside the inner area to provide an edge of the sealing part and sealed to seal the cup part, wherein the hole may be formed in the inner area in the sealing part.

Also, the gas discharge part may be provided in plurality.

A method for manufacturing a pouch type secondary battery according to an embodiment of the present invention for solving the problems includes: a step of drawing a pouch film to form a cup part; a step of punching a hole in at least one of the cup part or a sealing part extending to the outside of the cup part; a step of melting an electrolyte-resistant material to apply the electrolyte-resistant material to an inner circumferential surface of the hole; and a step of attaching a gas discharge part, through which a gas passes, from the outside of the hole.

Also, the method may further include, after the step of applying the electrolyte-resistant material to the inner circumferential surface of the hole, a step of accommodating an electrode assembly, which is formed by stacking electrodes and separators, in an accommodation space provided in the cup part; and a step of thermally pressing the sealing part.

Also, the step of attaching the gas discharge part may be performed after the step of thermally pressing the sealing part.

Also, the step of attaching the gas discharge part may be performed before the step of thermally pressing the sealing part.

Also, the electrolyte-resistant material may include at least one of polypropylene (PP), polyethylene (PE), or epoxy.

A pouch type secondary battery according to an embodiment of the present invention for solving the above problem includes: an electrode assembly formed by stacking electrodes and separators; and a battery case configured to accommodate the electrode assembly therein, wherein the battery case includes: a cup part having an accommodation space configured to accommodate the electrode assembly; a sealing part extending to the outside of the cup part; a gas discharge part attached to a hole which is formed to be punched in at least one of the cup part or the sealing part from the outside and through which a gas passes; and a coating part applied to an inner circumferential surface of the hole and having electrolyte resistance, wherein the gas discharge part includes: a gas discharge layer through which the gas passes; and an outer functional layer formed on an outer surface of the gas discharge layer and having a hydrophobic property.

Advantageous Effects

According to the embodiments of the present invention, there are at least the following effects.

The hole may be punched in the battery case, and the gas discharge part through which the gas passes may be attached to the hole. Therefore, when the internal pressure of the secondary battery increases, the inner gas may be discharged to the outside to adjust the pressure.

In addition, the outer functional layer or the inner functional layer may be formed on the gas discharge part to prevent the external moisture from being permeated and prevent the inner electrolyte from leaking.

In addition, since the gas discharge part is attached to the hole from the outside, the user convenience may be improved.

In addition, the coating part may be applied to the inner circumferential surface of the hole to prevent the metal of the gas barrier layer, which is exposed to the inner circumferential surface of the hole, from corroding by the electrolyte.

The effects of the prevent invention are not limited by the aforementioned description, and thus, more varied effects are involved in this specification.

MODE FOR CARRYING OUT THE INVENTION

Figure 1:
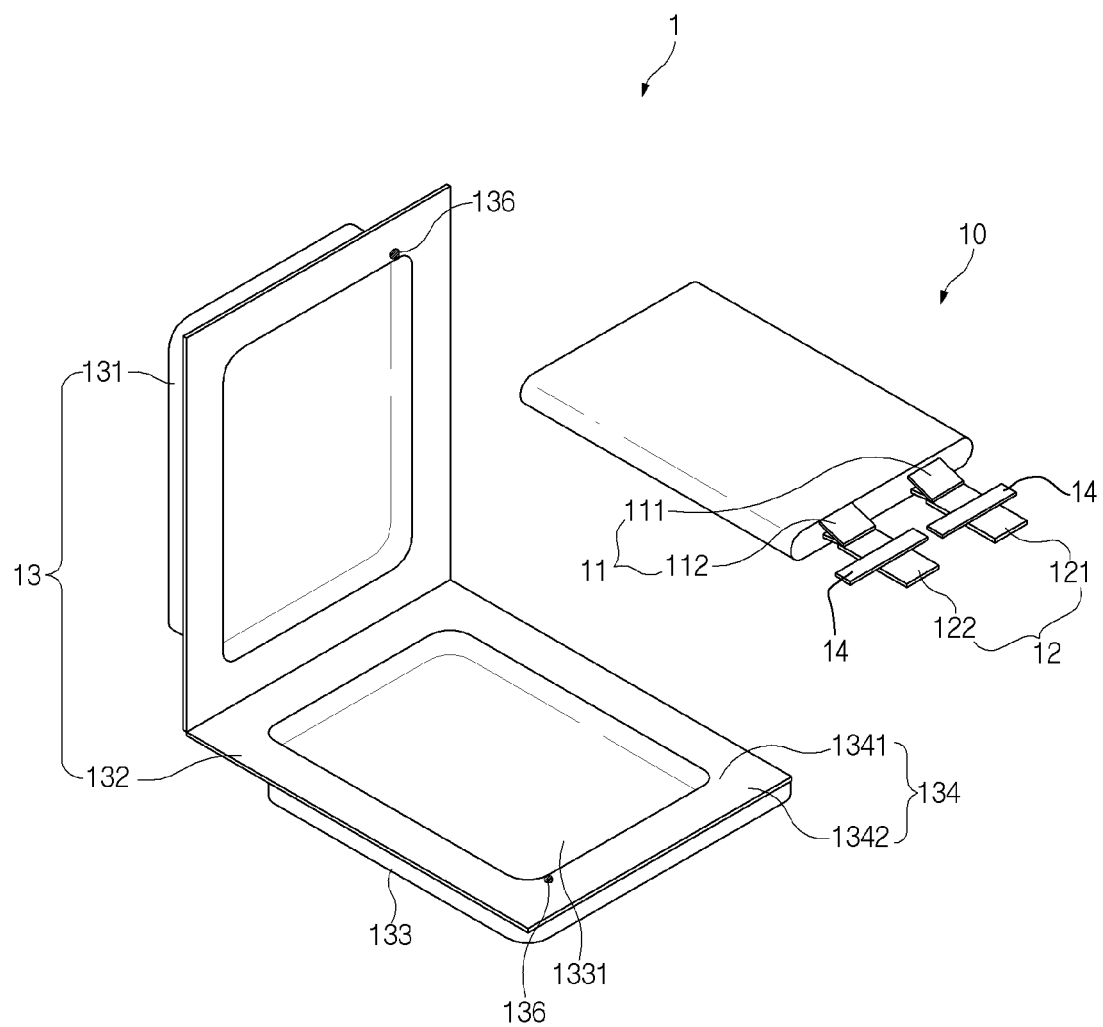
FIG. 1 is an assembled view of a pouch type secondary battery according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 2:
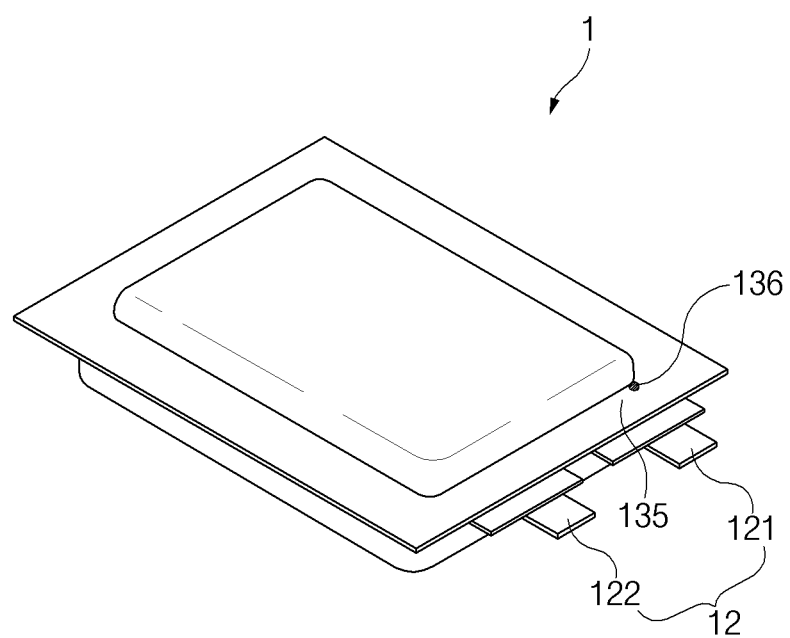
FIG. 2 is a perspective view of the pouch type secondary battery of FIG. 1.

FIG. 1 is an assembled view of a pouch type secondary battery according to an embodiment of the present invention, and FIG. 2 is a perspective view of the pouch type secondary battery.

As illustrated in FIG. 1, the pouch type secondary battery 1 according to an embodiment of the present invention includes an electrode assembly 10, in which electrodes such as a positive electrode and a negative electrode and separators are stacked, and a pouch type battery case 13 accommodating the electrode assembly 10 therein.

To manufacture the pouch type secondary battery 1, first, slurry in which an electrode active material, a binder, and a plasticizer are mixed with each other is applied to a positive electrode collector and a negative electrode collector to manufacture electrodes such as a positive electrode and a negative electrode. The electrodes are stacked on both sides of a separator to manufacture the electrode assembly 10 having a predetermined shape. Then, the electrode assembly 10 is inserted into the battery case 13, and the battery case 13 is sealed after injecting an electrolyte therein.

Particularly, the electrode assembly 10 may be a stacked structure including two types of electrodes such as a positive electrode and a negative electrode and a separator disposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two types of electrodes, i.e., the positive electrode and the negative electrode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 134, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 includes a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Also, the battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. However, the present invention is not limited thereto. For example, a cup part 133 may be formed in only the lower case 132, i.e., may be formed in various positions. Also, as illustrated in FIG. 1, one side of the upper case 131 and one side of the lower case 132 may be connected to each other. However, the present invention is not limited thereto. For example, the upper case 131 and the lower case 132 may be separately manufactured to be separated from each other.

The battery case 13 includes a gas discharge part 136 through which a gas passes. The gas discharge part 136 is attached to a hole 137, which is formed to be punched in at least one of the cup part 133 or the sealing part 134, from the outside.

The hole 137 is formed in at least one of the upper case 131 or the lower case 132. That is, only one hole 137 may be formed, but a plurality of holes 137 may be formed. Also, as illustrated in FIG. 1, the sealing part 134 extending to the outside of the cup part 133 includes an inner area 1341 adjacent to the cup part 133 and an outer area 1342 disposed outside the inner area 1341 to provide an edge of the sealing part 134 and sealed to seal the cup part 133. Here, it is preferable that the hole 137 is formed in the inner area 1341 rather than the outer area 1342 in the sealing part 134. Also, when sealing the sealing part 134 later, it is preferable to seal only the outer area 1342 without sealing the inner area 1341 in which the hole 137 is disposed. Thus, the two sealing parts 134 of the upper and lower cases 131 and 132 may be normally in contact with each other to close the hole 137, thereby preventing external moisture from being permeated and preventing the internal electrolyte from leaking. Also, when a large amount of gas is generated inside the secondary battery 1, a volume of the secondary battery 1 is expanded, and thus, the inner areas 1341 of the two sealing parts 134 that are in contact with each other are spaced apart from each other. Then, the hole 137 is opened to discharge the gas to the outside through the gas discharge part 136. However, the present invention is not limited thereto, and the hole 137 may be formed at various positions as long as the gas is easily discharged, such as formed in one surface of the cup part 133.

The gas may easily pass through the gas discharge part 136, but it is preferable that a liquid such as water, an electrolyte, and the like is not easy to pass the gas discharge part 136. The gas discharge part 136 will be described below in detail.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover the accommodation space from the upper side. Also, the electrolyte is injected, and the sealing part 134 formed on edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 2, the pouch type secondary battery 1 may be manufactured through the above-described method.

Figure 3:
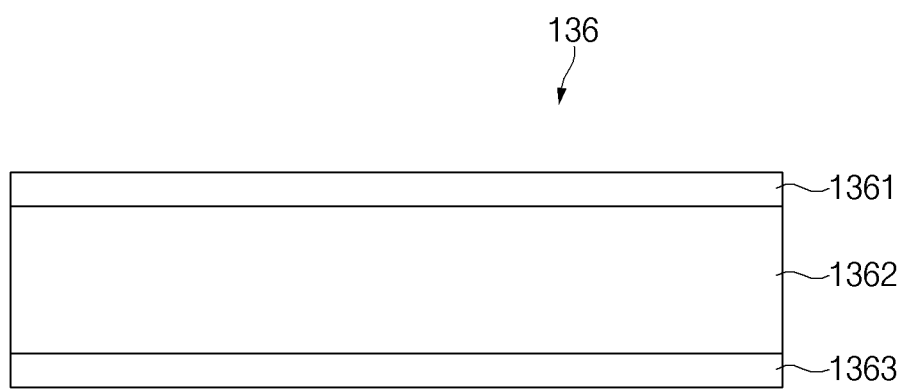
FIG. 3 is a cross-sectional view of a gas discharge part according to an embodiment of the present invention.

FIG. 3 is a cross-sectional view of the gas discharge part 136 according to an embodiment of the present invention.

The gas discharge part 136 is attached to the hole 137, which is formed to be punched in at least one of the cup part 133 or the sealing part 134, from the outside so that the gas passes therethrough. As illustrated in FIG. 3, the gas discharge part 136 includes a gas discharge layer 1362 through which the gas passes and an outer functional layer 1361 formed on an outer surface of the gas discharge layer 1362 and having a hydrophobic property. Also, the gas discharge part 136 may further include an inner functional layer 1363 formed on an inner surface of the gas discharge layer 1362 and having a hydrophobic property.

It is preferable that the gas discharge layer 1362 is formed as a semipermeable membrane, through which the gas easily passes, but a liquid such as water, an electrolyte, and the like is not easy to pass therethrough. The gas discharge layer 1362 may include at least one of polypropylene (PP), polyethylene (PE), polytetrafluoroethylene (PTFE), or polyvinylidene fluoride (PVDF). Also, in order to manufacture the gas discharge layer 1362, a biaxial stretching method may be used. That is, after extruding a raw material containing the above material in the form of a film, the extruded material may be stretched in a mechanical direction (MD) and a transverse direction to manufacture the gas discharge layer 1362. However, the present invention is not limited thereto, and a phase separation method may be used. That is, the raw material containing the above material may be applied to a plate in the form of a film to evaporate a solvent while changing a temperature and immerse the material in a water tank filled with the separate solution, thereby manufacturing the gas discharge layer 1362.

According to an embodiment of the present invention, a separate cover for opening and closing the hole formed in the battery case 13 is not provided. If the cover exists, it is not easy to close the hole 137 again after the cover opens the hole 137. In addition, in order to solve this problem, a separate hinge has to be installed so that the cover opens and closes the hole 137, and thus, a structure may be complicated, and durability may be reduced. However, if the cover does not exist, a small amount of moisture may be permeated from the outside through the gas discharge layer 1362 even if it is difficult for liquid to pass through the gas discharge layer 1362.

Accordingly, as illustrated in FIG. 3, the outer functional layer 1136 having the hydrophobic property is formed on the outer surface of the gas discharge layer 1362. Here, the outer surface of the gas discharge layer 1362 refers to a surface formed outside the secondary battery 1, i.e., in a direction opposite to the electrode assembly 10 when the secondary battery 1 is manufactured.

According to an embodiment of the present invention, a plurality of fine protrusions may be distributed on the outer surface of the outer functional layer 1361. Thus, the plurality of fine protrusions may have the hydrophobic property to prevent the moisture from being condensed on the outer surface of the outer functional layer 1361. Here, the outer surface of the outer functional layer 1361 refers to a surface opposite to the surface bonded to the gas discharge layer 1362. A diameter of each of the fine projections may be 50 nm to 10 μm, preferably 100 nm to 1 μm. This is because if the diameter of each of the fine protrusions is excessively small, the hydrophobic property may be deteriorated, and if the diameter is excessively large, fusing force between the gas discharge part 136 and the pouch film 135 may be deteriorated later.

In order to distribute the fine protrusions, the outer functional layer 1361 includes fine particles. The fine particles may include at least one of silica particles, carbon nanotubes (CNT), or alumina particles, and in particular, it is most preferable that the fine particles include carbon nanotubes (CNT). However, the outer functional layer 1361 has to have the hydrophobic property, but the silica particles have a hydrophilic property. Therefore, if the fine particles contain silica particles, it is preferable to contain only a very small amount of about 0.1 wt % to 2 wt %.

According to another embodiment of the present invention, the outer functional layer 1361 may have an oil or wax component. The oil or wax may have the hydrophobic property because of having a oleophobic property that does not intend to be mixed with moisture. Here, the oil may include at least one of fluorinated carbon oil, silicone oil, carbon-based oil, or fatty acid amide, and the wax may include at least one of paraffin wax or carbon-based wax.

If the cover does not exist in the hole 137, not only a small amount of moisture may be permeated, but also a small amount of electrolyte may leak from the inside through the gas discharge layer 1362. Accordingly, as illustrated in FIG. 3, the inner functional layer 1363 having the hydrophobic property may be formed on the inner surface of the gas discharge layer 1362. Here, the inner surface of the gas discharge layer 1362 refers to a surface formed inside the secondary battery 1, i.e., in a direction of the electrode assembly 10 when the secondary battery 1 is manufactured.

According to an embodiment of the present invention, a plurality of fine protrusions may be distributed on an outer surface of the inner functional layer 1363. For this, fine particles are also contained in the inner functional layer 1363, and the fine particles may include at least one of silica particles, carbon nanotubes (CNT), or alumina particles. Here, the outer surface of the inner functional layer 1363 refers to a surface opposite to the surface bonded to the gas discharge layer 1362.

According to another embodiment of the present invention, the inner functional layer 1363 may have an oil or wax component. Here, the oil may include at least one of fluorinated carbon oil, silicone oil, carbon-based oil, or fatty acid amide.

As described above, the outer functional layer 1361 and the inner functional layer 1363 may be formed to more effectively prevent the external moisture from being permeated and prevent the internal electrolyte from leaking.

Figure 4:
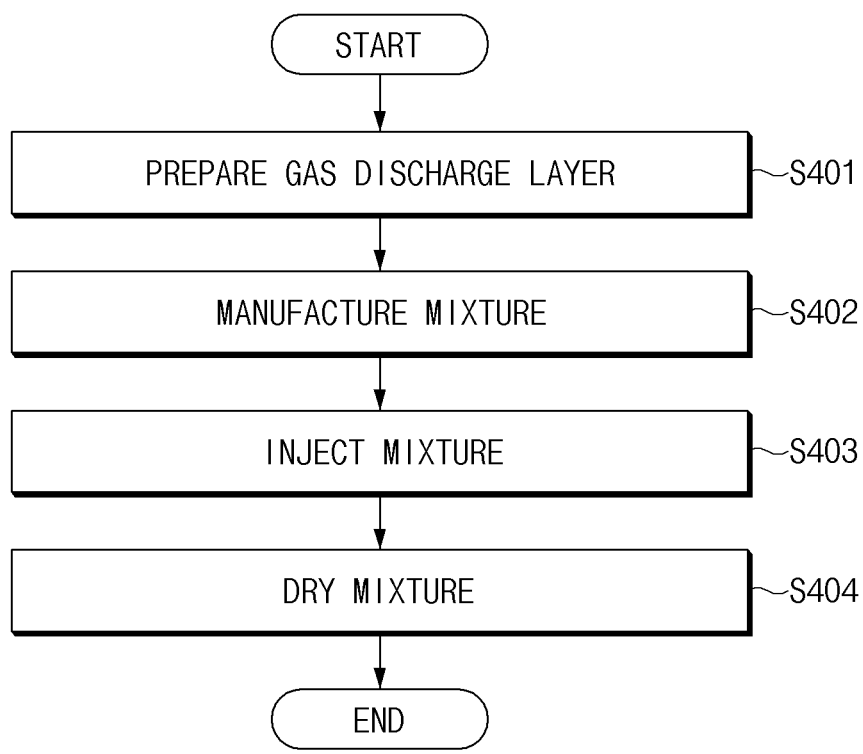
FIG. 4 is a flowchart illustrating a method for manufacturing a gas discharge part according to an embodiment of the present invention.

FIG. 4 is a flowchart illustrating a method for manufacturing the gas discharge part 136 according to an embodiment of the present invention.

A method of manufacturing the gas discharge part 136 according to an embodiment of the present invention includes: a step of preparing a gas discharge layer 1362 through which a gas passes; a step of stirring fine particles and a polymer solution to manufacture a mixture; a step of injecting the mixture onto at least one surface of the gas discharge layer 1362; and a step of drying the mixture.

Particularly, first, the gas discharge layer 1362 through which the gas passes is prepared (S401). As described above, it is preferable that the gas discharge layer 1362 is formed as a semipermeable membrane, through which the gas easily passes, but a liquid such as water, an electrolyte, and the like is not easy to pass therethrough. The gas discharge layer 1362 may include at least one of polypropylene (PP), polyethylene (PE), polytetrafluoroethylene (PTFE), or polyvinylidene fluoride (PVDF).

Then, the fine particles and the polymer solution may be stirred to manufacture the mixture (S402). Here, the fine particles may include at least one of silica particles, carbon nanotubes (CNT), or alumina particles. However, the outer functional layer 1361 has to have the hydrophobic property, but the silica particles have a hydrophilic property. Therefore, if the fine particles contain silica particles, it is preferable to contain only a very small amount of about 0.1 wt % to 2 wt %. In addition, a diameter of each of the fine particles may be 50 nm to 10 μm, preferably 100 nm to 1 μm. This is because if the diameter of each of the fine particles is excessively small, the hydrophobic property may be deteriorated, and if the diameter is excessively large, fusing force between the gas discharge part 136 and the pouch film 135 may be deteriorated later.

The polymer solution may include at least one of polypropylene (PP), polyethylene (PE), polytetrafluoroethylene (PTFE), or polyvinylidene fluoride (PVDF). That is, since the polymer solution contains a material equal or similar to that of the gas discharge layer 1362, an outer functional layer 1361 or an inner functional layer 1363 may be easily stacked on the gas discharge layer 1362.

Then, the mixture is injected onto at least one surface of the gas discharge layer 1362 (S403). If the mixture is injected onto an outer surface of the gas discharge layer 1362, the outer functional layer 1136 is formed, and if the mixture is injected onto an inner surface of the gas discharge layer 1362, the inner functional layer 1363 is formed.

When injecting the mixture, a spray coating method may be used. For example, the mixture may be injected at a pressure of 0.2 Mpa to 0.5 Mpa, particularly 0.4 Mpa by using a nozzle at a distance spaced approximately 8 cm to approximately 15 cm, particularly 10 cm from the gas discharge layer 1362. However, the present invention is not limited thereto, and various coating methods may be used.

Then, heat is applied to dry the mixture (S404). Here, if a temperature of the applied heat is excessively low, it takes much time to dry the mixture, and if the temperature is excessively high, a shape of the gas discharge layer 1362 may be deformed. Therefore, it is preferable to apply heat at a temperature of 50° C. to 140° C., particularly 50° C. to 100° C.

As a result, the outer functional layer 1361 or the inner functional layer 1363 may be formed. Also, the steps S403 to S404 may be repeatedly performed two or four times.

Figure 5:
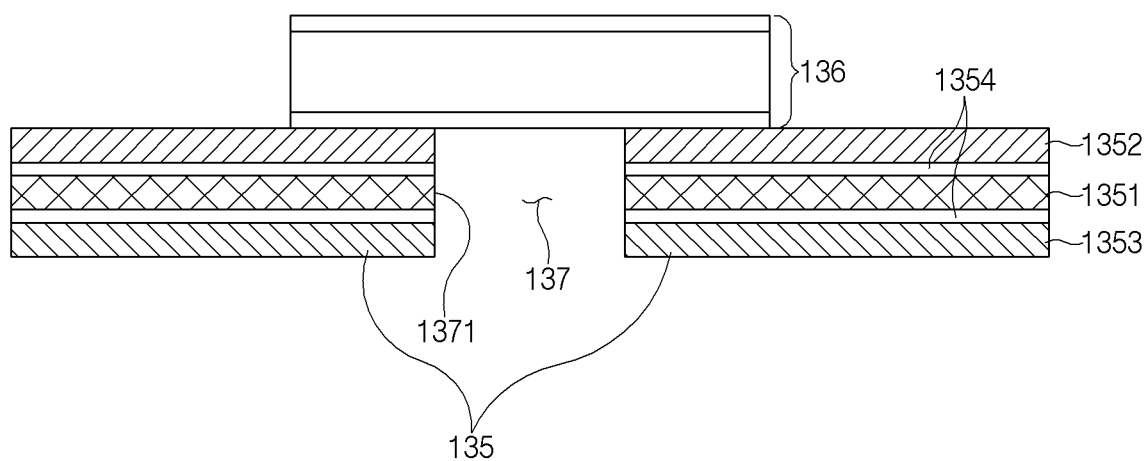
FIG. 5 is a cross-sectional view of a pouch film according to an embodiment of the present invention.

FIG. 5 is a cross-sectional view of a pouch film 135, illustrating the gas discharge part 136 attached to the hole 137 from the outside, according to an embodiment of the present invention.

In order to manufacture the battery case 13, first, the pouch film 135 is drawn and stretched to form a cup part 133. As illustrated in FIG. 5, the pouch film 135 includes a gas barrier layer 1351, a surface protection layer 1352, and a sealant layer 1353.

The gas barrier layer 1351 may secure mechanical strength of the battery case 13, block introduction and discharge of a gas or moisture outside the secondary battery 1, and prevent the electrolyte from leaking. In general, the gas barrier layer 1351 includes a metal. Particularly, it is preferable that aluminum (Al) foil is mainly used for the gas barrier layer 2351. Aluminum may secure the mechanical strength having a predetermined level or more, but be light in weight. Thus, aluminum may secure complement and heat dissipation for electrochemical properties due to the electrode assembly 10 and the electrolyte. However, the present invention is not limited thereto. For example, the gas barrier layer 1351 may be made of various materials. For example, the gas barrier layer 1351 may be made of one or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer refers to a layer disposed farthest from the gas barrier layer 1351 in a direction opposite to the direction in which the electrode assembly 10 is disposed with respect to the gas barrier layer 1351. The polymer forming the surface protection layer 1352 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, it is preferable that a polymer such as a nylon resin or polyethylene terephthalate (PET) having abrasion resistance and heat resistance is used mainly. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. Here, the innermost layer refers to a layer disposed farthest from the gas barrier layer 1351 in the direction in which the electrode assembly 10 is disposed. Accordingly, the gas barrier layer 1351 is stacked between the surface protection layer 1352 and the sealant layer 1353, as illustrated in FIG. 5. Since the sealant layer 1353 directly contacts the electrode assembly 10, the sealant layer 23 may have to have insulating properties. Also, since the sealant layer 23 contacts the electrolyte, the sealant layer 23 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the polymer forming the sealant layer 1353 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, it is preferable that a polyolefin-based resin such as polypropylene (PP) or polyethylene (PE) is used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 23 may be made of a coated polypropylene or a polypropylene-butylene-ethylene terpolymer. Also, the sealant layer 1353 may have a single layer structure made of one material or a composite layer structure in which two or more materials are respectively formed as layers.

An adhesive layer 1354 may be further formed between the gas barrier layer 1351, the surface protection layer 1352, and the sealant layer 1353 to bond the gas barrier layer 1351, the surface protection layer 1352, and the sealant layer 1353.

When the pouch film 135 having the stacked structure as described above is drawn using a punch, a portion of the pouch film 135 is stretched to form a cup part 133 including an accommodation space 1331 having a bag shape. Also, a hole 137 is punched in at least one of the cup part 133 or the sealing part 134.

When the hole 137 is punched, as illustrated in FIG. 5, the gas discharge part 136 through which the prepared gas passes is attached to the hole 137 from the outside. Only one hole 137 may be formed, but a plurality of holes 137 may be formed. Accordingly, only one hole 137 may be formed in the gas discharge part 136, but a plurality of holes 137 may be formed in the gas discharge part 136.

When the gas discharge part 136 is attached to the hole 137, the inner functional layer 1363 of the gas discharge part 136 adheres to one surface of the surface protection layer 1352. Particularly, in order to be prevented from being easily detached by the electrolyte, it is preferable that heat and a pressure is applied to perform sealing. Therefore, in order to allow the inner functional layer 1363 to be easily sealed to the surface protection layer 1352, it is preferable that the surface protection layer 1352 and the inner functional layer 1363 include the same or similar material.

As described above, since the gas discharge part 136 is attached to the hole 137 from the outside, the gas discharge part 136 may be attached regardless of timing of the sealing part 134 before and after the sealing. Accordingly, the user may easily attach the gas discharge part 136 to the hole from the outside.

However, in this case, a metal of the gas barrier layer 1351 exposed to an inner circumferential surface 1371 of the hole 137 may corrode by the electrolyte. Particularly, since the electrolyte contains hydrogen fluoride (HF), which is strongly acidic, the metal of the gas barrier layer 1351 may very easily corrode.

Figure 6:
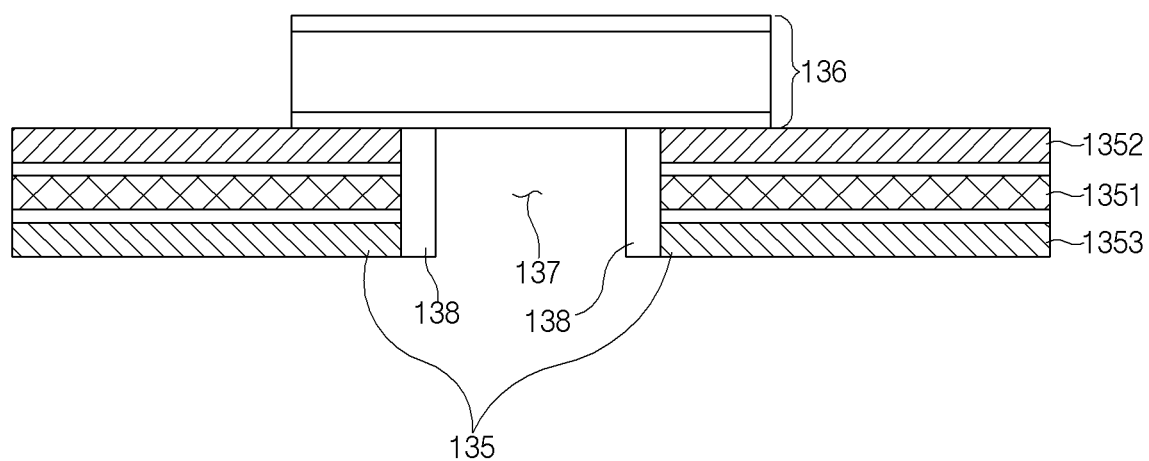
FIG. 6 is a cross-sectional view of a pouch film, according to another embodiment of the present invention.

FIG. 6 is a cross-sectional view a pouch film 135 illustrating a coating part 138 applied to the inner circumferential surface 1371 of the hole 137 according to an embodiment of the present invention.

According to an embodiment of the present invention, a hole 137 is punched in a battery case 13, and a gas discharge part 136 through which a gas passes is attached to the hole 137. Thus, when an internal pressure of the secondary battery 1 increases, an inner gas may be discharged to the outside to adjust a pressure. In addition, an outer functional layer 1361 or an inner functional layer 1363 may be formed on the gas discharge part 136 to prevent external moisture from being permeated and prevent an inner electrolyte from leaking. In addition, since the gas discharge part 136 is attached to the hole 137 from the outside, user convenience may be improved. In addition, the coating part 138 is applied to the inner circumferential surface 1371 of the hole 137 to prevent the metal of the gas barrier layer 1351 exposed to the inner circumferential surface 1371 of the hole from corroding by the electrolyte.

For this, the battery case 13 for the secondary battery 1 according to an embodiment of the present invention includes: a cup part 133 having an accommodation space 1331 configured to accommodate an electrode assembly 10 in which electrodes and separators are stacked; a sealing part 134 extending to the outside of the cup part 133; a gas discharge part 136 attached to a hole 137 which is formed to be punched in at least one of the cup part 133 or the sealing part 134 from the outside and through which a gas passes; and a coating part 138 applied to an inner circumferential surface 1371 of the hole 137 and having electrolyte resistance. The gas discharge part 136 includes a gas discharge layer 1362 through which the gas passes; and an outer functional layer 1361 formed on an outer surface of the gas discharge layer 1362 and having a hydrophobic property. Also, the gas discharge part 136 may further include an inner functional layer 1363 formed on an inner surface of the gas discharge layer 1362 and having a hydrophobic property.

According to an embodiment of the present invention, as illustrated in FIG. 6, the coating part 138 is applied to the inner circumferential surface 1371 of the hole 137. First, heat is applied to the electrolyte-resistant material to melt the electrolyte-resistant material. Then, the molten electrolyte-resistant material is applied to the inner circumferential surface 1371 of the punched hole 137. Here, a deep coating method in which the battery case 13 in which the hole 137 is formed is immersed in a water tank filled with the molten electrolyte-resistant material may be used. Also, the applied material may be dried to form the coating part 138 on the inner circumferential surface 1371 of the hole 137. Thus, the coating part 138 includes the electrolyte-resistant material, and the electrolyte-resistant material may include at least one of polypropylene (PP), polyethylene (PE), or epoxy. Here, polypropylene (PP) has a low melting point and is easy to be applied, and polyethylene (PE) has relatively excellent heat resistance and electrolyte resistance. Also, epoxy has excellent mechanical strength when the coating is completed.

Also, when the electrode assembly 10 is accommodated in the accommodation space 1331, the electrolyte is injected. Thereafter, when the upper case 131 and the lower case 132 may contact each other, and thermal compression is applied to the sealing part 134, the sealant layers 1353 may be bonded to each other to seal the battery case 13.

Also, the gas discharge part 136 through which the gas passes is attached from the outside of the hole 137. Thus, the secondary battery 1 according to an embodiment of the present invention may be manufactured. Here, the step of attaching the gas discharge part 136 from the outside of the hole 137 may be performed before the electrode assembly 10 is accommodated in the accommodation space 1331 of the cup part 133, and thermal pressing is performed on the sealing part 134 of the battery case 13, but may be performed after the thermal pressing is performed on the sealing part 134. That is, after the coating part 138 is formed on the inner circumferential surface 1371 of the hole 137, the gas discharge part 136 may be attached to the hole 137 from the outside, regardless of the timing. Accordingly, the user convenience may be improved.

According to another embodiment of the present invention, if the inner functional layer 1363 of the gas discharge part 136 includes polypropylene (PP), polyethylene (PE), etc., the inner functional layer of the gas discharge part 136 may be formed to be thick from the beginning. Also, when heat and a pressure are applied to one surface of the inner functional layer 1363 of the gas discharge part 136, the inner functional layer 1363 is partially melted. Here, a portion of the molten inner functional layer 1363 is applied to the inner circumferential surface 1371 of the hole 137 to form the coating part 138. Thus, it is not necessary to separately apply the coating part 138, and the coating part 138 may also be applied together in the process of attaching the gas discharge part 136.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery case for a secondary battery, comprising
a cup part having an accommodation space configured to accommodate an electrode assembly, the electrode assembly including electrodes and separators;
a sealing part extending to the outside of the cup part;
a gas discharge part attached to a hole, the hole formed through at least one of the cup part or the sealing part, the hole extending from a first end at an inside of the battery case to a second end at an outside of the battery case and configured to allow a gas to pass therethrough, the gas discharge part being attached to the first end of the hole and extending into the battery case; and
a coating part applied to an inner circumferential surface of the hole and having electrolyte resistance,
wherein the gas discharge part comprises:
a gas discharge layer configured to allow the gas to pass therethrough; and
an outer functional layer formed on an outer surface of the gas discharge layer, the outer functional layer being hydrophobic and extending across the hole, the gas discharge layer extending continuously across the outer functional layer from a first end of the outer functional layer to a second end of the outer functional layer.

2. The battery case of claim 1, wherein the coating part comprises at least one of at least one of polypropylene (PP), polyethylene (PE), or epoxy.

3. The battery case of claim 1, wherein the outer functional layer is formed by distributing a plurality of protrusions on an outer surface thereof.

4. The battery case of claim 3, wherein each of the protrusions have a diameter of 50 nm to 10 μm.

5. The battery case of claim 4, wherein each of the protrusions have a diameter of 100 nm to 1 μm.

6. The battery case of claim 1, wherein an inner functional layer of the gas discharge part comprises an oil or wax component.

7. The battery case of claim 6, wherein the oil comprises at least one of fluorinated carbon oil, silicone oil, carbon-based oil, or fatty acid amide.

8. The battery case of claim 1, wherein the gas discharge layer comprises at least one of polypropylene (PP), polyethylene (PE), polytetrafluoroethylene (PTFE), or polyvinylidene fluoride (PVDF).

9. The battery case of claim 1, wherein the gas discharge part further comprises an inner functional layer formed on an inner surface of the gas discharge layer, the inner functional layer being hydrophobic.

10. The battery case of claim 1, wherein the sealing part comprises:
an inner area adjacent to the cup part; and
an outer area disposed outside the inner area to provide an edge of the sealing part, the outer area configured to form a seal to seal the cup part,
wherein the hole is formed in the inner area of the sealing part.

11. The battery case of claim 1, wherein the battery case includes multiple gas discharge parts.

12. A pouch type secondary battery comprising:
an electrode assembly including electrodes and separators; and
a battery case configured to accommodate the electrode assembly therein,
wherein the battery case comprises:
a cup part having an accommodation space configured to accommodate the electrode assembly;
a sealing part extending to the outside of the cup part;
a gas discharge part attached to a hole, the hole formed through at least one of the cup part or the sealing part, the hole extending from a first end at an inside of the battery case to a second end at an outside of the battery case and configured to allow a gas pass therethrough, the gas discharge part being attached to the first end of the hole and extending into the battery case; and
a coating part applied to an inner circumferential surface of the hole and having electrolyte resistance,
wherein the gas discharge part comprises:
a gas discharge layer configured to allow the gas to pass therethrough; and
an outer functional layer formed on an outer surface of the gas discharge layer, the outer functional layer being hydrophobic and extending across the hole, the gas discharge layer extending continuously across the outer functional layer from a first end of the outer functional layer to a second end of the outer functional layer.

13. A battery case for a secondary battery, comprising
a cup part having an accommodation space configured to accommodate an electrode assembly, the electrode assembly including electrodes and separators;
a sealing part extending to the outside of the cup part;
a gas discharge part attached to a hole, the hole formed through the sealing part, the hole configured to allow a gas to pass therethrough; and
a coating part applied to an inner circumferential surface of the hole and having electrolyte resistance,
wherein the gas discharge part comprises:
a gas discharge layer configured to allow the gas to pass therethrough; and
an outer functional layer formed on an outer surface of the gas discharge layer, the outer functional layer being hydrophobic and extending across the hole, the gas discharge layer extending continuously across the outer functional layer from a first end of the outer functional layer to a second end of the outer functional layer.

* * * * *